UNITED STATES PATENT OFFICE.

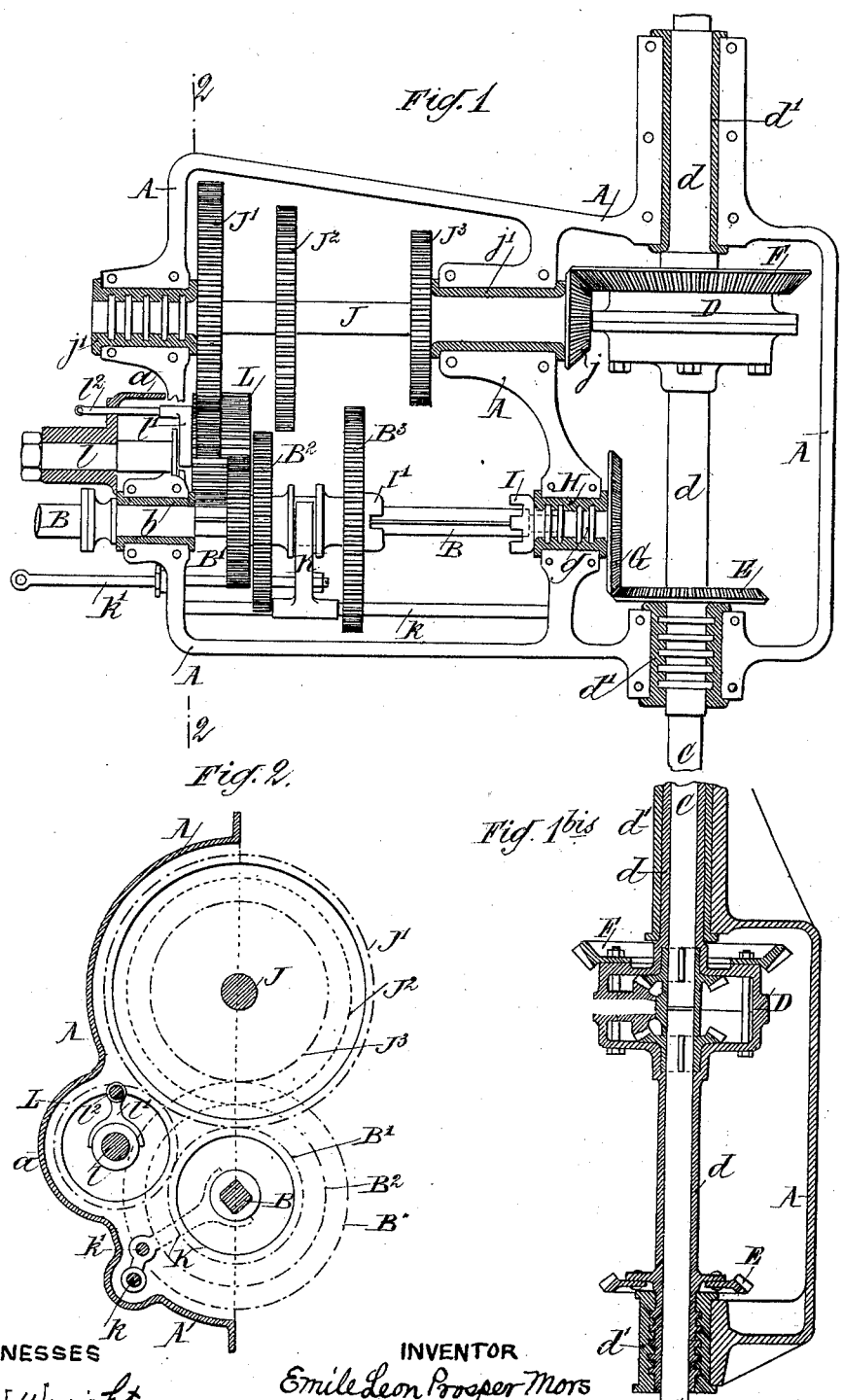

EMILE LEON PROSPER MORS, OF PARIS, FRANCE.

SPEED AND DIRECTION CHANGING MECHANISM.

SPECIFICATION forming part of Letters Patent No. 701,073, dated May 27, 1902.

Application filed February 15, 1902. Serial No. 94,223. (No model.)

*To all whom it may concern:*

Be it known that I, EMILE LEON PROSPER MORS, civil engineer, a subject of the King of Belgium, residing at 48 Rue du Théâtre, Paris, Republic of France, have invented certain new and useful Improvements in Speed and Direction Changing Mechanism for Motor-Vehicles, of which the following is a specification.

This invention relates to speed and direction changing mechanism for motor-vehicles, the arrangement being such that four speeds and backward travel are obtainable.

The invention is illustrated in the accompanying drawings, in which—

Figure 1 is a plan view, the upper part of the case being removed. Fig. 1$^{bis}$ is a central vertical section of the driven shaft and differential gear. Fig. 2 is a section on the line 2 2 of Fig. 1, the gear-wheels being represented diagrammatically.

A represents the case in which are lodged the various gear-wheels and parts constituting the speed and direction changing train, the various shafts being journaled in bearings rigidly connected with said case A.

The shaft B is directly driven by the motor, and C C are the two parts of the driven shaft receiving the transformed movement and which are connected by the differential. The differential box D is rigidly connected with two sleeves $d$ $d$, which receive the two parts of the shaft C C, situated within the gear-case, these two sleeves $d$ $d$ being journaled in bearings $d'$ $d'$. These two sleeves become practically one sleeve by the jointing together of the two halves of the differential box D, each sleeve being integral with one-half of the box. The rigid whole constituted by the differential box D and the sleeves $d$ $d$ carries two bevel gear-wheels E and F, one of which, E, meshes with a gear-wheel G, rigidly fixed upon a short shaft $g$, journaled in a bearing H and carrying one of the parts I of a claw-clutch, the other part I' of which clutch is hereinafter mentioned.

The gear-wheel F meshes with a pinion $j$, rigidly connected with a shaft J, journaled in bearings $j'$ $j'$, upon which shaft are rigidly attached three gear-wheels J' J$^2$ J$^3$.

The shaft B, directly driven by the motor, is journaled at one end at $b$, and its other extremity is journaled in the end of the short shaft $g$, above mentioned. This shaft B comprises a square portion upon which a sliding train, consisting of three gear-wheels B' B$^2$ B$^3$ is mounted. These gear-wheels are adapted to mesh with the gear-wheels J' J$^2$ J$^3$, respectively. This sliding train carries the part I' of the claw-clutch, the other part I of which is rigidly fixed to the shaft $g$. The displacement of this sliding train is effected by means of a fork K, guided upon a rod $k$ and actuated by a rod $k'$, operated in any suitable manner. When the sliding train occupies the position represented in the drawings, the pinion L may be caused to mesh simultaneously with the gear-wheels J' and B'. This pinion is journaled upon a shaft $l$, upon which it may be displaced by means of a fork $l'$, actuated by a rod $l^2$. The shaft $l$ is supported by the wall of a boss $a$, forming part of the gear-case A, and constituting a recess within which the pinion L is lodged when it is not intended to gear with the said pinions J' and B'.

The operation of the mechanism is as follows: When the gear for backward travel is not in use, the pinion L remains in the recess $a$. Three different forward-travel speeds are obtained by displacing the sliding train in such a manner as to cause the gear-wheels B' B$^2$ B$^3$ to mesh with the gear-wheels J' J$^2$ J$^3$, respectively. The differential is then driven by means of its gear-wheel F and the pinion $j$ of the intermediate shaft J. The fourth speed for forward travel is obtained by displacing the sliding train to the end of its travel, so as to cause the engagement of the two parts I I' of the claw-clutch. In this position the three gear-wheels B' B$^2$ B$^3$ are not in engagement with either of the gear-wheels J' J$^2$ J$^3$, and the transmission is effected directly from the shaft B to the differential by means of the gear-wheels G and E. Greater efficiency is thus obtained, because the intermediate shaft J does not come into use. It merely runs light. This arrangement is advantageous, because the fourth speed is that most frequently employed. In order to effect rearward travel, the sliding train is caused to occupy the position shown in the drawings and the pinion L is caused to gear simultaneously with the gear-wheels J' and B'. The movement is then transmitted to the shaft J by the pinion L and is thus reversed.

I may modify the speed and direction changing device described above in various constructional details without departing from the principle of this invention.

What I claim, and desire to secure by Letters Patent of the United States, is—

1. A speed and direction changing mechanism for motor-vehicles, comprising a driving-shaft, a driven shaft, a clutch between the two, such clutch when in operation adapted to give the highest speed, spur-wheels movable lengthwise on the driving-shaft, a second shaft geared to the driven shaft and spur-gears carried by said second shaft each adapted to gear with one of the lengthwise-movable spur-wheels of the driven shaft to produce varying speeds and a third spur-wheel adapted to mesh with one spur-wheel of each of the two shafts to reverse the speed, substantially as described.

2. A speed and direction changing mechananism for motor-vehicles, comprising a driven shaft, a clutch geared thereto, another shaft J, a number of spur-wheels carried by the latter shaft, which is also geared to the driven shaft, a driving-shaft, a sliding train of gear-wheels carried by the driving-shaft to gear one at a time with a spur-wheel of shaft J or to run free, or to engage with the clutch, according to the degree of lengthwise motion, in combination with a third shaft, a spur-wheel thereon also adapted to be moved lengthwise and adapted to gear with a spur-wheel of the shaft J, and with one on the driving-shaft, substantially as described.

3. A speed and direction changing mechanism for motor-vehicles, comprising a driven shaft, a shaft geared thereto, having spur-gears, a driving-shaft having lengthwise-movable spur-wheels, a third shaft, a lengthwise-movable spur-wheel carried by the third shaft, a casing with a recess in its wall and bearings in the casing carrying said shafts, means for moving the spur-wheel of the third shaft into the recess formed in the casing-wall or into gear with spur-wheels of the other shafts, and means for moving the spur-wheels of the driving-shaft lengthwise, in combination with a clutch mechanism geared to the driven shaft and adapted to clutch the driving-shaft upon its extreme lengthwise movement at which time its spur-wheels are adapted to run free, substantially as described.

In testimony whereof I have hereunto set my hand, in presence of two subscribing witnesses, this 3d day of February, 1902.

EMILE LÉON PROSPER MORS.

Witnesses:
GUSTAVE DERMONT,
EDWARD P. MACLEAN.